(12) United States Patent
Campbell

(10) Patent No.: US 7,667,464 B2
(45) Date of Patent: Feb. 23, 2010

(54) TIME SEGMENTATION OF FREQUENCIES IN CONTROLLED SOURCE ELECTROMAGNETIC (CSEM) APPLICATIONS

(75) Inventor: Tracy Campbell, Austin, TX (US)

(73) Assignee: WesternGeco L.L.C., Houston, TX (US)

( * ) Notice: Subject to any disclaimer, the term of this patent is extended or adjusted under 35 U.S.C. 154(b) by 700 days.

(21) Appl. No.: 11/555,935

(22) Filed: Nov. 2, 2006

(65) Prior Publication Data

US 2008/0106265 A1 May 8, 2008

(51) Int. Cl.
*G01V 3/08* (2006.01)
(52) U.S. Cl. .................. 324/348; 324/338; 324/339
(58) Field of Classification Search .............. 324/348, 324/338, 339
See application file for complete search history.

(56) References Cited

U.S. PATENT DOCUMENTS

| | | | | |
|---|---|---|---|---|
| 4,147,973 | A | * | 4/1979 | Weber .................. 324/326 |
| 4,282,486 | A | * | 8/1981 | Culver et al. ............. 324/371 |
| 4,617,518 | A | | 10/1986 | Srnka |
| 4,633,182 | A | | 12/1986 | Dzwinel |
| 5,654,638 | A | * | 8/1997 | Shoemaker ............... 324/329 |

FOREIGN PATENT DOCUMENTS

GB 2070345 9/1981

WO WO0214906 2/2002

OTHER PUBLICATIONS

Boerner, David E. et al., Orthogonality in CSAMT and MT Measurements, Geophysics, vol. 58, No. 7, Jul. 1993, pp. 924-934.
Chave, Alan D. et al., Controlled Electromagnetic Sources for Measuring Electrical Conductivity Beneath the Oceans, Journal of Geophysical Research, vol. 87, No. B7, pp. 5327-5338, Jul. 10, 1982.
Chave, Alan D. et al., Electrical Exploration Methods in Applied Geophysics vol. 2, Electrical Exploration Methods for the Seafloor, Chapter 12, 1991, pp. 931-966.
Constable, S. et al., Marine Controlled-Source Electromagnetic Sounding, Journal of Geophysical Research, vol. 101, No. B3, Mar. 10, 1996, pp. 5519-5530.
Constable, S. et al., Occam's Inversion: A Practical Algorithm for Generating Smooth Models from Electromagnetic Sounding Data, Geophysics, vol. 52, No. 3, Mar. 1987, pp. 289-300.

(Continued)

*Primary Examiner*—Reena Aurora
(74) *Attorney, Agent, or Firm*—Liangang (Mark) Ye; Kevin McEnaney

(57) ABSTRACT

A method for measuring a resistivity of a subsurface formation that includes transmitting continuously a signal at a first fundamental frequency at full power for a first period of time within a single window of time causing electromagnetic energy to propagate in the subsurface formations, transmitting continuously the signal at a second fundamental frequency at full power for a second period of time within the single window of time causing electromagnetic energy to propagate in the subsurface formations, measuring variations in the electromagnetic energy propagated through the subsurface formations at receivers at the first and the second fundamental frequencies, and determining the resistivity of the subsurface formations using the measurements of the variations in electromagnetic energy at the receivers.

15 Claims, 4 Drawing Sheets

OTHER PUBLICATIONS

Edwards, R. Nigel, On the Resource Evaluation of Marine Gas Hydrate Deposits Using Sea-Floor Transient Electric Dipole-Dipole Methods, Geophysics vol. 62, No. 1, Jan.-Feb. 1997, pp. 63-74.

Edwards, R.N., Controlled Source Electromagnetic Mapping of the Crust, Encyclopedia of Solid Earth Geopysics, ed. James D. Van Nostrand Reinhold, New York, 1989, pp. 127-138.

Yuan, J. et al., Electromagnetic Assessment of Offshore Methane Hydrate Deposits on the Cascadia Margin, American Geophyiscal Union Fall Meeting, San Francisco, 1998, pp. 363-375.

Kearey, Philip, The Encyclopedia of the Solid Earth Sciences, Blackwell Scientific Publications.

Evans, Rob L. et al., On the Electrical Nature of the Axial Melt Zone at 13 Degrees N on the East Pacific Rise, Journal of Geophysical Research, vol. 99, No. B1, Jan. 10, 1994, pp. 577-588.

Flosadottir, A. et al., Marine Controlled-Source Electromagnetic Sounding, Journal of Geophysical Research, vol. 101, No. B3, Mar. 10, 1996, pp. 5507-5517.

U.S. Dept. of Energy Office of Basic Energy Sciences, Division of Engineering and Geosciences, Two and Three-Dimensional Magnetotelluric Inversion, Technical Report: Dec. 1, 1991-May 31, 1994.

Grant, I.S. et al., Electromagnetism, Second Edition, John Wiley & Sons.

Kaufman, A. et al., Methods in Geochemistry and Geophysics, 16.

Kvenvolden, K. et al., A Primer on the Geological Occurrence of Gas Hydrate, Gas Hydrates: Relevance to World Margin Stability and Climate Change, Geological Society, London, Special Publications, 137, 9-30.

MacGregor, L. et al., The RAMESSES Experiment—III. Controlled-Source Electromagnetic Sounding of the Reykjanes Ridge . . . , Geophys. J. Int. 1998, 135, pp. 773-789.

MacGregor, L. et al., Use of Marine Controlled Source Electromagnetic Sounding for Sub-Basalt Exploration, EAGE 61st Conference and Technical Exhibition, Helsinki, Finland, Jun. 7-11, 1999.

Nekut, A. et al., Petroleum Exploration Using Controlled-Source Electromagnetic Methods, Proceedings of the IEEE, vol. 77, No. 2, Feb. 1989.

Sinha, M. C. et al., Evidence for Accumulated Melt Beneath the Slow-Spreading Mid-Atlantic Ridge, Phil. Trans. R. Soc. Land. A, 355, 1997, pp. 233-253.

Sinha, Martin, Controlled Source EM Sounding: Survey Design Considerations for Hydrocarbon Applications, LITHOS Science Report Apr. 199, 1, 95-101.

Sinha, M. et al., An Active Source Electromagnetic Sounding System for Marine Use, Marine Geophysical Researches 1990, 12: 59-68.

Strack, K. et al., Integrating Long-Offset Transient Electromagnetic (LOTEM) with Seismics in an Exploration Environment, Geophysical Prospecting, 1996, 44, 997-1017.

Tseng, H. et al., A Borehole-to-Surface Electromagnetic Survey, Geophysics vol. 63, No. 5, pp. 1565-1572.

Das, Umesh C., Apparent Resistivity Curves in Controlled-Source Electromagnetic Sounding Directly Reflecting True Resistivities in a Layered Earth, Geophysics vol. 60, No. 1, Jan.-Feb. 1995, pp. 53-60.

Das, Umesh C., Frequency- and Time-Domain Electromagnetic Responses of Layered Earth-A Multiseparation, Multisystem Approach, Geophysics vol. 60, No. 1, Jan.-Feb. 1995, pp. 285-290.

Thompson, Arthur H. et al., U.S. Statutory Invention Registration H1490, Sep. 5, 1995.

Walker, Peter W. et al., Parametric Estimators for Current Excitation on a Thin Plate, Geophysics vol. 57, No. 6, Jun. 1992, pp. 766-773.

Ward, S.H. et al., Electromagnetic Theory for Geophysical Applications, in Investigations in Geophysics: Electromagnetic Methods in Applied Geophysics, ed. Nabighian, Society of Exploration Geophysicists, Oklahoma, 1988.

Yuan, J. et al., The Assessment of Marine Gas Hydrates through Electrical Remote Sounding: Hydrate without a BSR?, Geophysical Research Letters, vol. 27, Aug. 2000, pp. 2397-2400.

Yuan, Edwards et al., Electromagnetic Assessment of Offshore Methane Hydrate Deposits on the Cascadia Margin, MARELEC 1999.

Maurer, Hansruedi et al., Optimized Design of Geophysical Experiments, SEG Paper.

Grant, I.S. et al., Electromagnetic Waves, Chapter 11, pp. 365-407.

* cited by examiner

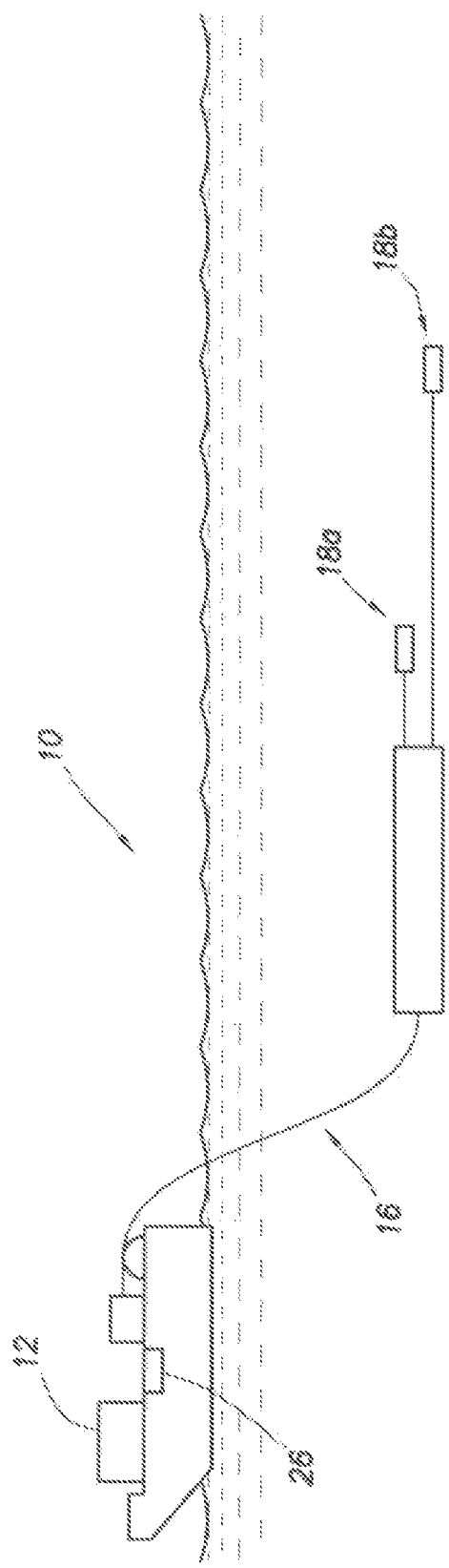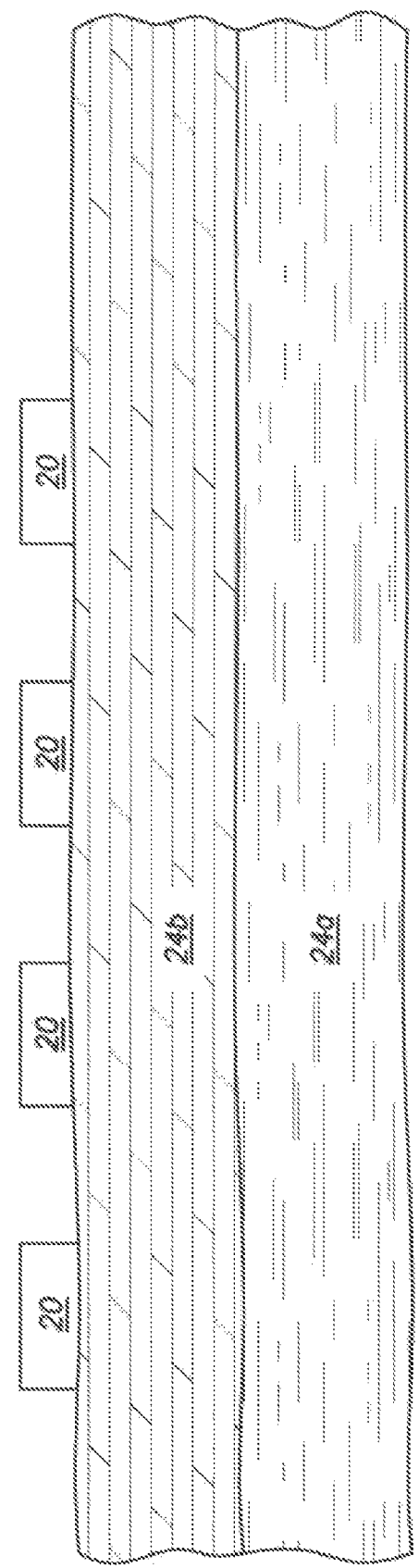
FIG. 1

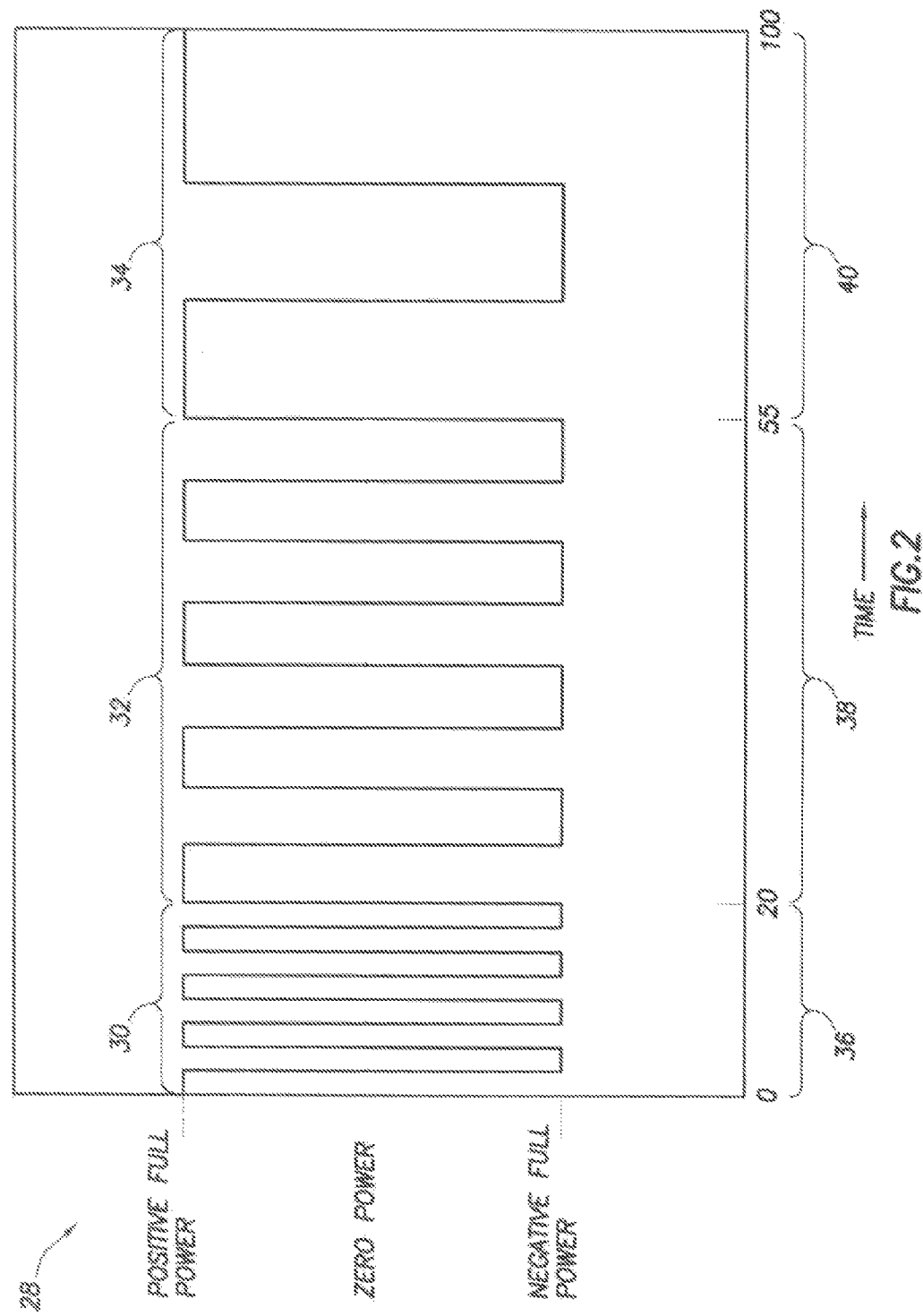

| FREQUENCIES | AMPERES |
|---|---|
| $f_0$ 1 Hz | 1267 |
| 3 $f_0$ 3 Hz | 407 |
| 5 $f_0$ 5 Hz | 227 |
| 6 $f_0$ 7 Hz | 144 |

FIG. 3A

| FREQUENCIES | AMPERES |
|---|---|
| $f_0$ 3 Hz | 1267 |
| 3 $f_0$ 9 Hz | 407 |
| 5 $f_0$ 15 Hz | 227 |
| 6 $f_0$ 21 Hz | 144 |

FIG. 3B

| FREQUENCIES | AMPERES |
|---|---|
| $f_0$ 5 Hz | 1267 |
| 3 $f_0$ 15 Hz | 407 |
| 5 $f_0$ 25 Hz | 227 |
| 6 $f_0$ 35 Hz | 144 |

FIG. 3C

TIME SEGMENTATION OF FREQUENCIES IN CONTROLLED SOURCE ELECTROMAGNETIC (CSEM) APPLICATIONS

FIELD OF THE INVENTION

The present invention relates to the field of hydrocarbon exploration, and more particularly to transmitting each different frequency used in controlled source electromagnetic applications within a time window at full power.

BACKGROUND

Subsurface porous rocks are saturated with fluids. The fluids may be water (salt water or fresh water) or hydrocarbons (gas or oil). The resistivity of a formation may depend heavily on the fluid that is contained within the formation. For example, formations containing hydrocarbons or fresh water tend to be much more resistive that formations that contain salt water. As a result, the resistivity of subsurface formations (e.g., porous rocks) may be measured to determine if the formation is likely to contain hydrocarbons.

The resistivity of subsurface formations may be measured using various methods including a method commonly referred to as controlled source electromagnetics (CSEM). CSEM typically uses a finite size transmitter in which a known time-varying current is made to flow in the subsurface formations by a suitable generator or power supply. The transmitter is typically coupled to two electrodes. The two electrodes are electrically connected to one another via the salt water which acts as a conductor. Hence, a circuit is formed carrying a time-varying current generated by the transmitter.

The time-varying circuit produces a time-varying electromagnetic field which according to Faraday's Law produces a voltage, which drives currents in the ground. That is, the time-varying electromagnetic field causes currents to flow in the subsurface formations. The currents in the subsurface formations may produce secondary magnetic fields which are measured by receivers placed on the ocean floor. The resistivity of the subsurface formations lying below the receivers may be inferred from the magnitude of these secondary magnetic fields.

Typically, the transmitter generates an output current at various frequencies to detect subsurface formations at different depths and regions of the subsurface. The frequency range for CSEM is typically between $\frac{1}{32}$ Hz to 32 Hz. Different frequencies are required to detect subsurface formations at different depths and regions of the subsurface because, in general, lower frequencies are able to penetrate to greater depths and higher frequencies can provide more response at shallower depths.

Different frequencies may penetrate across subsurface formations in a variety of ways. For example, a vessel towing the transmitter by a line may pass the subsurface formations using a single frequency (e.g., $\frac{1}{3}$ Hz) and then make a second pass over the subsurface formations using a second frequency (e.g., 1 Hz). However, having to make multiple passes over the subsurface formations is time consuming and uneconomic.

Alternatively, the transmitter may transmit a complex waveform that can be deconvolved into a number of frequencies, which are often harmonics of the waveform. However, the energy generated at any particular frequency is greatly reduced using this method. By generating less power at any particular frequency, the signal-to-noise ratio is lower thereby making it more difficult to accurately measure the resistivity in the subsurface formations.

In another alternative method, the transmitter may transmit a square wave at a fundamental frequency. The transmitted square wave will produce energy at the fundamental frequency and also at each odd harmonic frequency. For example, a fundamental frequency of 1 Hz will also contain energy at 3 Hz, 5 Hz and beyond. However, the energy contained within the harmonic frequencies is much reduced from the power at the fundamental frequency. Hence, this alternative method also has problems with having a low signal-to-noise ratio thereby making it more difficult to accurately measure the resistivity in the subsurface formations.

Therefore, there is a need in the art for transmitting each of the different frequencies used in CSEM at full power thereby more accurately and efficiently measuring resistivity of subsurface formations at different depths and regions.

It is thus a desire of the present invention to provide a system and method for generating an output current at various frequencies, each at full power, within a time window. It is a still further desire to provide a system and method for accurately determining the resistivity of a subsurface formations at different depths and regions without making multiple passes over the subsurface formations.

SUMMARY OF THE INVENTION

In one aspect, the invention relates to a method for measuring a resistivity of a subsurface formation that includes transmitting continuously a signal at a first fundamental frequency at full power for a first period of time within a single window of time causing electromagnetic energy to propagate in the subsurface formations, transmitting continuously the signal at a second fundamental frequency at full power for a second period of time within the single window of time causing electromagnetic energy to propagate in the subsurface formations, measuring variations in the electromagnetic energy propagated through the subsurface formations at receivers at the first and the second fundamental frequencies, and determining the resistivity of the subsurface formations using the measurements of the variations in electromagnetic energy at the receivers.

In another aspect, the invention relates to an electromagnetic transmitter that includes a source, a first electrode electrically connected to the source; and a second electrode electrically connected to the source. The source may be configured to transmit continuously a signal at a first fundamental frequency at full power for a first period of time within a single window of time causing electromagnetic energy to propagate in the subsurface formations, and to transmit continuously the signal at a second fundamental frequency at full power for a second period of time within the single window of time causing electromagnetic energy to propagate in the subsurface formations.

In another aspect, the invention relates to an electromagnetic survey system that includes one or more receivers positioned on a seafloor, an electromagnetic transmitter that includes a first electrode electrically connected to the source, and a second electrode electrically connected to the source. The source may be configured to transmit continuously a signal at a first fundamental frequency at full power for a first period of time within a single window of time causing electromagnetic energy to propagate in the subsurface formations, and transmit continuously the signal at a second fundamental frequency at full power for a second period of time within the single window of time causing electromagnetic energy to propagate in the subsurface formations. The system may also include a computer containing executable code such that when executed, causes the computer to analyze data from the receivers to determine a characteristic of a sub-surface formation.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein:

FIG. 1 is an example of a CSEM system for measuring the resistivity in subsurface formations;

FIG. 2 is an example plot of power versus time illustrating a transmitter generating a square wave at full power at three separate fundamental frequencies during three separate time periods within a window of time;

FIGS. 3A-3C are example tables illustrating example frequencies (fundamental frequencies and their associated harmonic frequencies) transmitted during each time period as well as the associated current generated for each of the frequencies.

DETAILED DESCRIPTION

Figure 4:
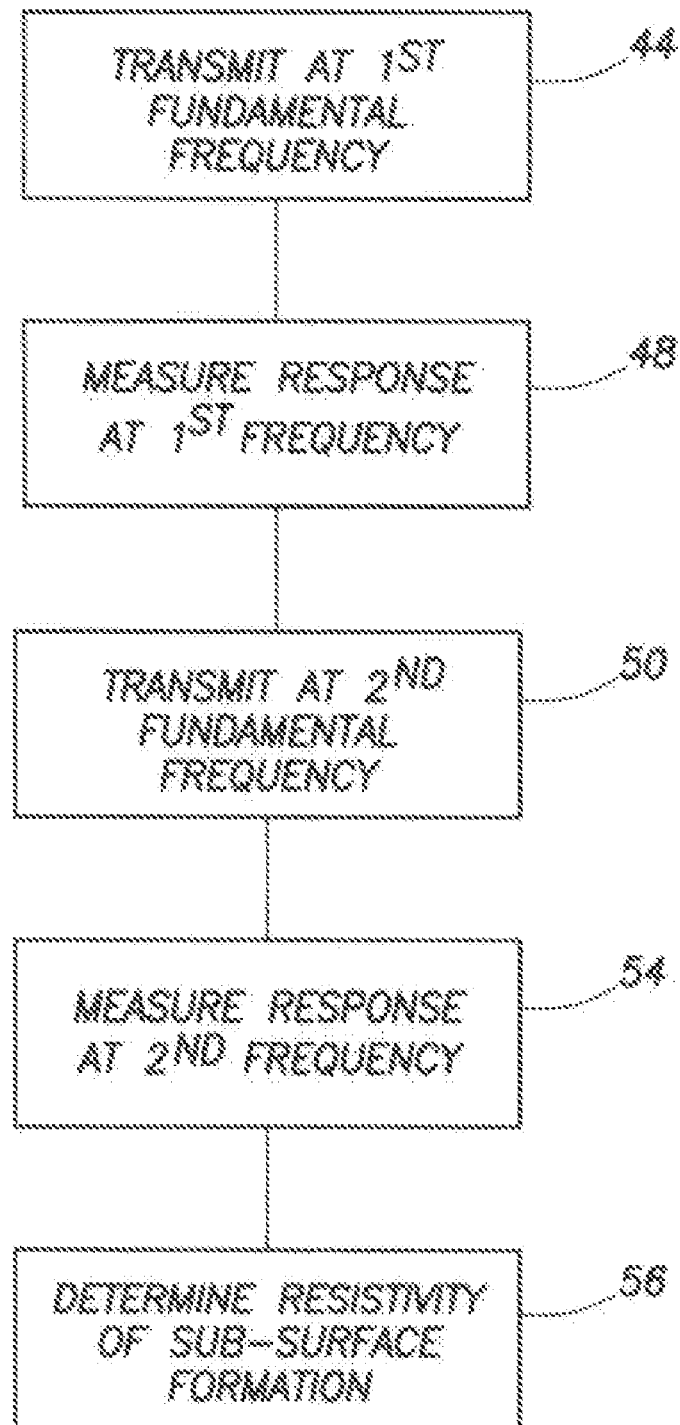
FIG. 4 is an example flowchart of a method for accurately and efficiently measuring the resistivity in subsurface formations using CSEM technology in accordance with an embodiment of the present invention.

Refer now to the drawings wherein depicted elements are not necessarily shown to scale and wherein like or similar elements are designated by the same reference numeral through the several views.

FIG. 1 illustrates a CSEM system 10 for measuring the resistivity in subsurface formations 24 in accordance with an embodiment of the present invention. System 10 includes a vessel 12 towing a transmitter or source 14 via a cable 16. System 10 includes receivers 20 positioned on the sea floor 22 above subsurface formations 24. For exemplary purposes, formation 24b is a shale formation and formation 24a is an oil-sand.

Transmitter 14 includes electrodes 18a, 18b. Transmitter 14 is configured to generate a time-varying current. Electrodes 18a, 18b are coupled electrically via the sea water, which acts as a conductor thereby forming a circuit carrying a time-varying current generated by transmitter 14. Transmitter 14 is configured to generate an output current at various frequencies in order to detect subsurface formations at different depths and regions of the subsurface. The frequency range for CSEM is typically between 1/32 Hz to 32 Hz, although other frequencies may be used. Different frequencies are required to detect subsurface formations 24 at different depths and regions of the subsurface because, in general, lower frequencies are able to penetrate to greater depths and higher frequencies can provide more response at shallower depths.

Electrodes 18 are coupled together to form a circuit carrying a time-varying current. The time-varying current carried by the circular loop of wire produces a time-varying electromagnetic field which according to Faraday's Law produces an electromotive force or voltage, which drives currents (i.e., causes currents to flow) in the subsurface formations 24 beneath floor 22. The currents in the subsurface formations 24 produce secondary magnetic fields. These secondary magnetic fields are measured by receivers 20. That is, the variations in electromagnetic energy are measured by receivers 20. Receivers 24 may be placed on floor 22 spaced apart from one another at a given spacing. Each receiver 20 may be configured to include sensors located at the end of "arms" that are approximately 10 meters in length. The variations in electromagnetic energy are measured by receivers 20 across these arms. It is noted that other designs and configurations fore electromagnetic receivers may be used.

Measurements of these variations in electromagnetic energy may be used by a computer 26 to determine the resistivity of subsurface formations 24. In one example, the data collected by receivers 20 (e.g., variations in electromagnetic energy) is analyzed by computer 26. In other examples, the computer 26 does not necessarily have to be located on vessel 12, but may be located in any location (e.g., office building) capable of receiving the data collected by receivers 20.

Transmitter 14 must generate an output current at various frequencies in order to investigate subsurface formations 24 at different depths and regions of the subsurface. An example CSEM method 10 provides generating an output current at various frequencies, each at full power, within a single window of time. Thus the resistivity of formation 24 at different depths can be more accurately measured, while reducing the number of passes over the formation 24.

FIG. 2 is a plot of power versus time illustrating transmitter 14 (FIG. 1) generating a square wave at full power at three separate fundamental frequencies during three separate time periods within a window of time (e.g., 100 seconds). The window of time 28 may be an integer multiple of a period of the waveform of the generated signal (e.g., square wave). The transmitter 14 generates a square wave at three separate frequencies 30, 32, 34 within single window of time 28. Each frequency 30, 32, 34 is generated during a respective separate time period 36, 38, 40 of time window 28. For example, in FIGS. 3A-C, the first frequency 30 is generated during the first time period 36, the second frequency 32 is generated during the first time period 38, etc.

FIGS. 3A, 3B and 3C illustrate the frequencies 30, 32, 34 (fundamental frequencies and their associated harmonic frequencies) transmitted by transmitter 14 during each respective time period 36, 38, 40 as well as the associated current (and indirectly power) generated for each of the frequencies in accordance with an embodiment of the present invention. It is noted that although FIGS. 3A, 3B, and 3C show three fundamental frequencies, other numbers of fundamental frequencies may be used. For example, two or four or more fundamental frequencies may be used.

Referring to FIGS. 1 and 3A, transmitter 14 generates a square wave at the first fundamental frequency 30 of 1 Hz at full power (in this example, full power corresponds to a current of 1,000 Amperes) for first time period 36 (0 to 20 seconds) in a single window of time 28 (100 seconds). The component frequencies of the square wave generated may be referred to as "harmonic frequencies." These harmonic frequencies are naturally produced as a result of the generation of the current at the fundamental frequency. The odd harmonic frequencies (e.g., $3^{rd}$ harmonic frequency represented as $3f_o$, $5^{th}$ harmonic frequency represented as $5f_o$, $7^{th}$ harmonic frequency represented as $7f_o$) correspond to odd multiples of the fundamental frequencies. The odd harmonic frequencies for the first fundamental frequency 30 of 1 Hz used during the first period of time 36 correspond to 3 Hz, 5 Hz and 7 Hz for the third, fifth and seventh harmonic frequencies, respectively.

As further illustrated in FIG. 3A, first fundamental frequency 30 is transmitted by transmitter 14 at full power (in this example, full power corresponds to a current of 1,000 Amperes) during the first period of time 36. For a 1000 Ampere square wave, the current transmitted at fundamental frequency 30 (1 Hz) during first period of time 36 is at 1264 Amperes (note that transmitting a 1000 amp square wave will produce a fundamental current at 1267 amps). However, the current transmitted at the harmonic frequencies ($3f_0$, $5f_0$ and $7f_0$) may be less. For example, the current transmitted at $3f_0$ (3 Hz) during first period of time 36 is at 407 Amperes. The current transmitted at $5f_0$ (5 Hz) during first period of time 36 is at 227 Amperes. The current transmitted at $7f_0$ (7 Hz) during first period of time 36 is at 144 Amperes. As illustrated in FIG. 3, the higher the harmonic frequency, the less current that is transmitted at that frequency which results in a reduction in power (power is directly proportional to the amount of current being generated).

Similarly, as illustrated in FIG. 3B, transmitter 14 generates a square wave at second fundamental frequency 32 of 3 Hz at full power for second period of time 38 (20 to 55 seconds) in single window of time 28 (100 seconds).

FIG. 3C illustrates transmitter 14 generating a square wave at third fundamental frequency 34 of 5 Hz at full power for a third period of time 40 (55 to 100 seconds) in a single window of time 28 (100 seconds).

If the different frequencies within a wave series are harmonics of each other, as illustrated in the example of FIGS. 2 and 3, then the net result will be an equivalent power at that frequency greater than the transmitted power at any one frequency. For example, transmitter 14 generated current at second fundamental frequency 32 of 3 Hz during second period of time 38 which is the $3^{rd}$ harmonic frequency of first fundamental frequency 30 of 1 Hz transmitted during first period of time 36. The total power at 3 Hz is greater than the total power of the source 14 since transmitter 14 generated current at 3 Hz as a fundamental frequency at 1,000 Amperes as well as the third harmonic frequency during the first period of time at 500 Amperes. As the total power at 3 Hz is greater than the total power of the source, the amount of noise in the signal-to-noise ratio generated in the responses to the square waves at 3 Hz is reduced thereby improving the accuracy in determining the resistivity of the subsurface formations.

As transmitter 14 generates current at different frequencies, different time-varying electromagnetic fields are generated. Responses to these electromagnetic fields may result in secondary magnetic fields being produced by the subsurface formations as a result of currents being caused to flow in the subsurface formations. The variations in electromagnetic energy as result of these secondary magnetic fields are measured by receivers 20. The data collected by receivers 20 may be averaged across each time period 36, 38, 40 individually within the single window of time 28 to reduce the noise thereby increasing the signal-to-noise ratio and improving the accuracy in determining the resistivity of subsurface formations 24. For example, the data collected by receivers 20 during first period of time 36 when transmitter 14 transmits the square wave at first fundamental frequency 30 may be averaged over first period of time 36. Similarly, the data collected by receivers 20 during second and third periods of time 38, 40 may be averaged over the second and third periods of time, respectively.

By transmitting three different fundamental frequencies 30, 32, 34 within a single window of time 28, one is able to collect the information one would if one made three separate passes over subsurface formations 24 transmitting at a different frequency for each pass. Hence, the time inefficiency in making multiple passes over subsurface formations is avoided.

While the description of FIGS. 2 and 3 discuss transmitting harmonic frequencies within a wave series (e.g., second frequency 32 is a harmonic of first frequency 30, third frequency 34 is a harmonic of first frequency 30), transmitter 14 is also configured to transmit a wide range of frequencies not within the harmonics of the fundamental frequency. Further, the frequency rates and the power levels used in FIGS. 2 and 3 are exemplary.

With reference to FIGS. 1 through 4, an embodiment of a method 42 for more accurately and efficiently measuring the resistivity in subsurface formations using CSEM technology is disclosed.

In step 44, transmitter 14 continuously transmits an electromagnetic signal at a first fundamental frequency 30 (e.g. 1 Hz) and associated harmonic frequencies. In one example, the electromagnetic signal is a square wave. The signal may be transmitted at full power for first time period 36 (e.g., 0 to 20 seconds) within single window of time 28 (e.g., 100 seconds). The transmitted electromagnetic energy propagates in subsurface formations 24 as a result of transmitting the square wave at the first fundamental frequency 30 and associated harmonic frequencies. In step 48, receivers 20 measure the resulting electromagnetic signal at positions on the sea floor. The resulting signal may indicate the resistivity of subsurface formations 24, through which the electromagnetic signal has propagated. The measurement may receive resulting electromagnetic signals at the first fundamental frequency 30 and the associated harmonic frequencies.

In step 50, transmitter 14 continuously transmits an electromagnetic signal at a second fundamental frequency 32 (e.g., 3 Hz) and associated harmonic frequencies. In one example, the electromagnetic signal is a square wave. The signal may be transmitted at full power for second time period 36 (e.g., 20 to 55 seconds) within single window of time 28 (e.g., 100 seconds). The transmitted electromagnetic energy propagates in subsurface formations 24 as a result of transmitting the square wave at the second fundamental frequency 36 and associated harmonic frequencies. In step 54, receivers 20 measure the resulting electromagnetic signal at positions on the sea floor. The resulting signal may indicate the resistivity of subsurface formations 24, through which the electromagnetic signal has propagated. The measurement may receive resulting electromagnetic signals at the second fundamental frequency 32 and the associated harmonic frequencies.

The previous steps, for example steps 50 and 54, may be repeated for additional fundamental frequencies. The invention is not limited by the number of fundamental frequencies that are used within a time window.

In step 56, computer 26 determines the resistivity of subsurface formations 24 using the electromagnetic measurements of receivers 20. Such computer may be located on the vessel 12, or it may be located remotely, such as in an analysis center. In such an example, the data may be transmitted, such as by satellite or by the internet, to the remote location for analysis.

Method 42 may include other and/or additional steps that, for clarity, are not depicted. Method 42 may further be executed in a different order presented and that the order presented in the discussion of FIG. 4 is illustrative. Further, certain steps in method 40 may be executed in a substantially simultaneous manner.

From the foregoing detailed description of specific embodiments of the invention, it should be apparent that a method and system for determining resistivity of subsurface formations that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method for measuring the resistivity in subsurface formations using controlled source electromagnetics, the method comprising the steps of:
   transmitting continuously a signal at a first fundamental frequency at full power for a first period of time within a single window of time causing electromagnetic energy to propagate in the subsurface formations;
   transmitting continuously the signal at a second fundamental frequency at full power for a second period of time within the single window of time causing electromagnetic energy to propagate in the subsurface formations;
   measuring variations in the electromagnetic energy propagated through the subsurface formations at receivers at the first and the second fundamental frequencies; and
   determining the resistivity of the subsurface formations using the measurements of the variations in electromagnetic energy at the receivers.

2. The method of claim 1, further comprising the step of measuring the variations in the electromagnetic energy at the receivers at the first and the second fundamental frequencies and associated harmonic frequencies.

3. The method as recited in claim 2, wherein the first and second fundamental frequencies are frequencies within a range from $1/32$ Hz to 32 Hz.

4. The method of claim 1, further comprising the steps of:
   transmitting one or more harmonics of the first fundamental frequency at less than the full power; and
   transmitting one or more harmonics of the second fundamental frequency at less than the full power.

5. The method of claim 4, wherein one of the one or more harmonics of the first fundamental frequency is equal to the second fundamental frequency, wherein a total power at the second fundamental frequency is greater than a total power of a source of the second fundamental frequency.

6. The method of claim 1, wherein the single window of time is an integer multiple of a period of a waveform of the signal.

7. The method as recited in claim 6, wherein the waveform of the signal is a square wave.

8. The method as recited in claim 1, wherein the waveform of the signal is a square wave.

9. The method as recited in claim 1, wherein the first and second fundamental frequencies are frequencies within a range from $1/32$ Hz to 32 Hz.

10. The method recited in claim 1, further comprising towing an electromagnetic source over the receivers and the subsurface formation.

11. The method recited in claim 10, wherein the electromagnetic source is towed over the receivers and subsurface formation in a single pass.

12. An electromagnetic transmitter, comprising:
   a source;
   a first electrode electrically connected to the source; and
   a second electrode electrically connected to the source,
   wherein the source is configured to:
      transmit continuously a signal at a first fundamental frequency at full power for a first period of time within a single window of time causing electromagnetic energy to propagate in the subsurface formations; and
      transmit continuously the signal at a second fundamental frequency at full power for a second period of time within the single window of time causing electromagnetic energy to propagate in the subsurface formations.

13. An electromagnetic survey system, comprising:
   one or more receivers positioned on a seafloor;
   an electromagnetic transmitter, comprising:
      a first electrode electrically connected to the source; and
      a second electrode electrically connected to the source,
      wherein the source is configured to:
         transmit continuously a signal at a first fundamental frequency at full power for a first period of time within a single window of time causing electromagnetic energy to propagate in the subsurface formations; and
         transmit continuously the signal at a second fundamental frequency at full power for a second period of time within the single window of time causing electromagnetic energy to propagate in the subsurface formations; and
   a computer containing executable code such that when executed, causes the computer to analyze data from the receivers to determine a characteristic of a sub-surface formation.

14. A method for measuring the resistivity in subsurface marine formations using controlled source electromagnetics, the method comprising the steps of:
   positioning receivers on a marine floor;
   towing, in a single pass, a source for transmitting electromagnetic energy over the receivers and the subsurface formations;
   transmitting continuously a signal at a first fundamental frequency at full power for a first period of time within a single window of time causing electromagnetic energy to propagate in the subsurface formations;
   transmitting one or more harmonics of the first fundamental frequency at less than the full power;
   transmitting continuously the signal at a second fundamental frequency at full power for a second period of time within the single window of time causing electromagnetic energy to propagate in the subsurface formations, wherein the second fundamental frequency is equal to the one of the transmitted harmonics of the first fundamental frequency;
   transmitting one or more harmonics of the first fundamental frequency at less than the full power;
   measuring variations in the electromagnetic energy propagated through the subsurface formations at the receivers at the first and the second fundamental frequencies and their harmonic frequencies; and
   determining the resistivity of the subsurface formations using the measurements of the variations in electromagnetic energy at the receivers.

15. The method of claim 14, wherein:
   the single window of time is an integer multiple of a period of a wave form of the signal;
   the waveform of the signal is a square wave; and
   the first and second fundamental frequencies are within a range from $1/32$ Hz and 32 Hz.

* * * * *

UNITED STATES PATENT AND TRADEMARK OFFICE
CERTIFICATE OF CORRECTION

PATENT NO. : 7,667,464 B2  Page 1 of 1
APPLICATION NO. : 11/555935
DATED : February 23, 2010
INVENTOR(S) : Tracy Campbell It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 783 days.

Signed and Sealed this

Twenty-eighth Day of December, 2010

David J. Kappos
*Director of the United States Patent and Trademark Office*